Sept. 28, 1971      H. Y. CARR      3,608,211
LAUNCHING DEVICE
Filed Feb. 2, 1970
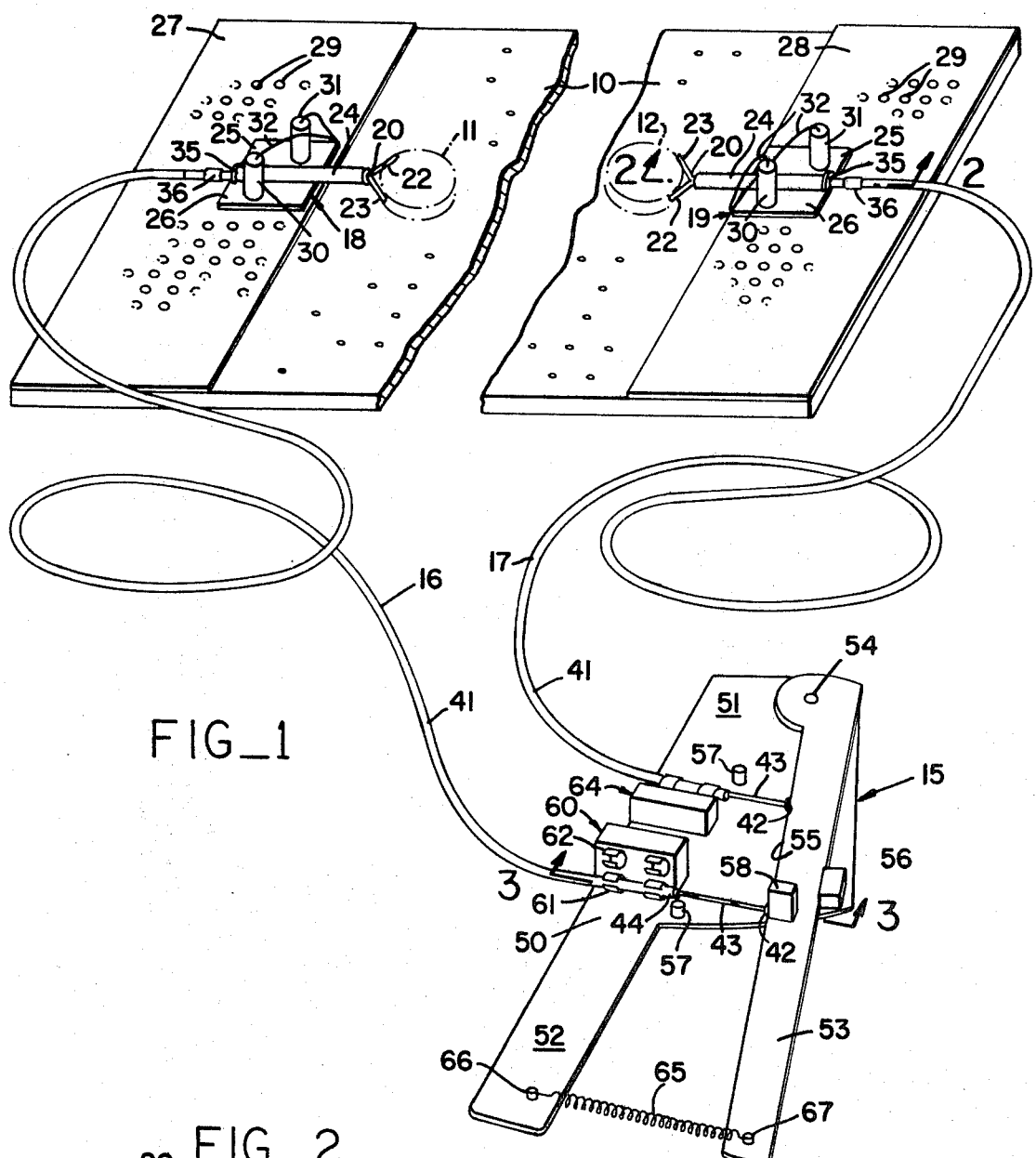
FIG_1
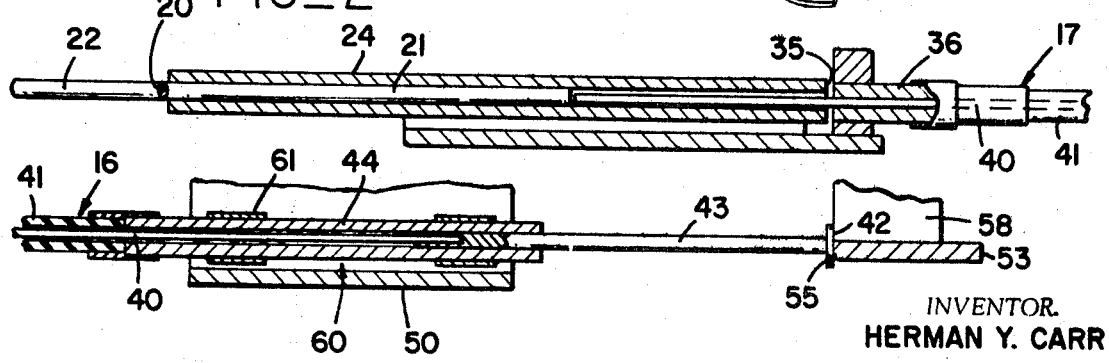
FIG_2
FIG_3
INVENTOR.
HERMAN Y. CARR
BY Owen, Wickersham & Erickson
ATTORNEYS United States Patent Office 3,608,211
Patented Sept. 28, 1971

3,608,211
LAUNCHING DEVICE
Herman Y. Carr, Somerville, N.J., assignor to Paul A.
Stokstad, doing business as Pasco Scientific, San
Leandro, Calif.
Filed Feb. 2, 1970, Ser. No. 7,637
Int. Cl. G09b 23/08
U.S. Cl. 35—19R                          10 Claims

ABSTRACT OF THE DISCLOSURE

A launching device for demonstrating collision principles. Each of a plurality of pushers has a direction-controlling tube and a firing rod slidable inside said tube, with a direction-controlling bumper on its outer end. Each pusher has a corresponding cable having a stationary outer flexible tube and a flexible rod slidable inside engaging the firing rod at one end and a plunger extending beyond the other end of said tube. An initiator has a stationary member to which the plunger ends of all the flexible tubes are secured and a trigger lever pivoted to the stationary member and engaging the plungers, the distances of the plungers from the pivot relative to each other determining the relative launching speeds.

---

This invention relates to apparatus for simultaneously launching a plurality of objects generally toward each other. Such an apparatus is commonly used in the study of collisions.

Lecture and laboratory demonstrations illustrating basic principles are an essential component of an introductory physics course. Among the basic principles that can be greatly clarified by demonstration are momentum and energy conservation as illustrated by collisions. Blackboard diagrams are never as satisfactory as actual demonstrations. Billard table demonstrations, though useful, are specialized to rolling objects of equal mass. Moreover, to be quantitative these demonstrations require apparatus with devices for measuring absolute velocities, so that they have usually had to be foregone, and inadequate or makeshift demonstrations had to be used along with apologies and verbal explanation that more accurate apparatus could have shown the results.

Now air tables, tracks, and troughs are available that enable substantial elimination of sliding friction and the use of objects of various masses. By using a transparent air table with an overhead projector, all students in a large lecture hall can view the experiment easily. But like the billiard demonstrations, it has been difficult to make these quantitative. The present invention relates to the launching of pucks or other objects of various kind across such frictionless tracks or tables in such a manner that collision experiments can be quantitatively demonstrated without the necessity of absolute velocity measurements. The relative speeds of two pucks can bear a preselected quantitative relationship to each other that obviates the need for knowing their absolute velocities.

The launching device of this invention projects or releases two objects (called pucks herein) simultaneously in the same or different directions at speeds that can be in simple ratios to each other: e.g., 1 to 1, 2 to 1, 3 to 1, and so on. The directions can be adjusted to cause head-on collisions, glancing collisions, and so on. The apparatus is relatively inexpensive yet very reliable and very accurate.

Other objects and advantages will appear from the following description of a preferred form of the invention.

In the drawings:

FIG. 1 is a view in perspective of a lecture demonstration device for launching two objects simultaneously in a collision path and embodying the principles of the invention.

FIG. 2 is a view in section taken along the line 2—2 in FIG. 1.

FIG. 3 is a view in section taken along the line 3—3 in FIG. 1.

For best use, the launching device of FIG. 1 is used with an air table 10 or other frictionless table or track system, but the device can also be used on flat, preferably slick, tables where desired, as where illustration of the effects of sliding friction or rolling friction is desired. The objects to be launched may be pucks 11, 12 of any desired shape (shown here as circular discs) or may be balls or other bodies, depending on the demonstrator's desire and on what best suits his purpose. The drawing shows a launcher for simultaneously imparting ratioed velocities to two objects, but it will be apparent that three or more objects can be simultaneously launched when that is desired.

Essentially the device consists of an operator-controlled initiator 15, a plurality of connecting cables or other transmitting means 16 and 17, and a pusher 18 or 19 at the outer end of each cable 16, 17.

In each pusher 18 or 19, an impeller 20 is provided, and a preferable form thereof is Y-shaped, having a stem or firing rod 21 and preferably having diverging bumper branches 22 and 23 that meet at a V. The angle of divergence is bisected by the rod 21, so that when the bumper branches 22 and 23 engage the puck 11 or 12, they center it and place its center of gravity in line with the firing rod 21, thereby giving full directional control. The firing rod 21 slides in a short tube 24 whose orientation fixes the direction of the launching velocity. Each tube 24 may be mounted on a flat surface, such as may be provided by a pair of flanges 25 and 26, which, in use, may overlie a pegboard 27 or 28 adjacent the air table 10 and having a series of pegholes 29. Each of a pair of readily releasable securing members 30 and 31 has a projecting peg that passes through an opening in the flange 25 or 26 and engages a peghole 29 in the pegboard 27 or 28. A wire or string 32 may join the members 30 and 31 together at the top for convenience and for loss prevention. To the rear end 35 of each tube 24 a cable 16 or 17 may be secured, as by a fitting 36.

Each cable 16, 17 may be similar to a camera cable release, having a center flexible wire rod 40 that slides inside a stationary flexible tubular casing 41. At one end the rod 40 projects into the tube 24 and abuts the firing rod 21 of the impeller 20. At the other end, a head 42 terminates a plunger 43 on the end of the rod 40 that projects well beyond the casing 41 and beyond a fitting 44 at the end of the casing 41. The launching speed of the puck 11 or 12 is identical to the speed at which the impeller 20 moves, which is the speed of its firing rod 21. The speed of the firing rod 21 is identical to that of the center rod 40 of the cable 16 or 17, which is that of its plunger 43 at the input end of the cable 16 or 17. This speed, in turn, is determined by the initiator 15 which acts somewhat like a trigger. Hence, the initiator 15 determines the speed of both pucks 10 and 11.

The initiator 15 comprises a fixed or stationary member 50, preferably having a broad table-like portion 51 and a narrower handle portion 52. The fitting 44 for each cable is preferably mounted on the fixed table-like portion 51. The initiator 15 also comprises a movable bar or trigger lever 53 that is pivoted at one end by a pivot member 54 to the fixed member 50, and this trigger lever 53 engages the heads 42 of the plungers 43, preferably by a straight edge 55. A stop 56 mounted on the table-like portion 51 provides a standard starting position for the trigger lever 53, and one or more bumpers or other members 57 may limit the end position of the trigger lever 53. Thus, as the trigger lever 53 is moved to the left in FIG. 1 (i.e., squeezed toward the handle portion 52, clockwise and away from the stop 56), it moves the plungers 43, and the plungers 43 are inserted into their tubes 41 in the same time interval. Hence, the speed at which the trigger lever 53 is moved determines the launching speed of the pucks 10 and 11.

The actual distance that each plunger 43 moves while the trigger lever 53 is moved (and hence the speed with which it and the rod 40 and the firing rod 21 move) is directly proportional to the distance of the plunger 43 from the pivot 54. Thus, if two pucks 10 and 11 are to be projected at the same speed, their two plungers 43 are mounted at the same distance from the pivot 54, while if one puck 10 is to go twice as fast as another puck 11, the plunger 43 for the puck 10 is located exactly twice as far from the pivot 54 as the plunger 43 for the other puck 11.

If desired, the trigger lever 53 can have a projection 58 for engaging two or more plunger heads 42 at the same distance from the pivot, and hence at the same speed, more easily. There can be a cable mounting device 10 for a basic selected speed, secured to the table portion 51, having pairs of clips 61, 62, etc., each holding one cable 16, 17, etc. Similarly, a half speed cable mount 64 may be provided as shown, all set and precisely premeasured to give exactly half the velocity to its puck. Other calibrations and mounts may be provided, and movable mounts may be used, mounted on a slot that is calibrated, so that any desired speed relation can be obtained.

Only the speed ratio ordinarily enters an analysis of a collision experiment. The absolute value of the speed, determined by the time taken to squeeze the trigger lever 53, can be increased by closing the trigger more quickly. If a given speed must be reproduced accurately, the trigger lever 53 may be closed by a spring 65 anchored at 66 to the handle 52 and at 67 to the trigger lever 53. In that case the operator may hold the trigger lever 53 against the stop 56 and then release it. The spring 65 may be removed if there is no need for it.

To those skilled in the art to which this invention relates, many changes in construction and widely differing embodiments and applications of the invention will suggest themselves without departing from the spirit and scope of the invention. For example, the cables may be replaced by hydraulic devices with practically identical appearance. The disclosures and the description herein are purely illustrative and are not intended to be in any sense limiting.

I claim:

1. A launching device for demonstrating collision principles, including in combination:
   a plurality of pushers, each having a direction-determining tube and a firing rod slidable inside said tube and having object engaging and aligning means on an outer end thereof,
   a corresponding plurality of cables, each having a stationary outer flexible tube and a flexible rod slidable inside said tube, said flexible tube being connected at one end to said direction-determining tube and said flexible rod there engaging said firing rod, the flexible rod having a plunger extending beyond the other end of said tube, and
   an initiator having a stationary member to which said other end of each said flexible tube is secured and a trigger lever pivoted at one end to said stationary member and engaging each said plunger,
   whereby the distances of said plungers from said pivot relative to each other determine the relative launching speeds.

2. The launching device of claim 1 wherein said object engaging and aligning means comprises two identical members on the outer end of said firing rod, diverging at an angle bisected by said firing rod.

3. The launching device of claim 1 wherein said pushers each include a flat supporting member secured to said direction determining tube and having at least two openings therethrough, a pegboard underlying said supporting member and having a plurality of openings with which said two openings can be aligned, and two anchoring means, one for passing through said two openings and into said openings in said pegboard, for enabling each said pusher to be set in any of a variety of positions.

4. The launching device of claim 1 wherein said initiator has releasable mounting means for accepting each said cable's flexible tube in a predetermined location.

5. The launching device of claim 4 wherein one of said mounting means can support a plurality of said flexible tubes at the same distance from said pivot, one above the other and said trigger lever has means for engaging all said plungers simultaneously.

6. The launching device of claim 1 wherein said initiator has a stop member on said stationary member engaging said trigger lever at a wide open position.

7. The launching device of claim 6 having a spring connecting said trigger lever to said stationary member at a distance from said pivot, whereby when said lever is pulled against the force of said spring into engagement with said stop member and then released, said spring pulls it back to a closed position.

8. A launching device for objects, for demonstrating collision principles, including in combination:
   a plurality of pushers, each having a direction-determining tube and a firing rod slidable inside said tube and having bumper means on an outer end thereof for engaging an object to be launched,
   a corresponding plurality of transmitting means, each having output means at one end for impelling said firing rod and having input means at the other end, actuation of which generates a corresponding actuation of said output means and therefore of said firing rod,
   an initiator having a stationary pivot and a trigger lever pivoted to said pivot and engaging all said input means,
   whereby the distances of said input means from said pivot relative to each other determine the relative launching speeds.

9. The launching device of claim 8 wherein said transmitting means comprises a tube having inside means connecting said input and output means.

10. The launching device of claim 9 wherein said inside means comprises a wire slidable in said tube and having one end engaging said firing rod and serving as said output means and having as said input means a plunger at the other end engaged by said trigger lever.

References Cited

UNITED STATES PATENTS

| 593,794 | 11/1897 | Wade | 273—129UX |
| 2,720,398 | 10/1955 | Andrews | 273—129X |
| 3,415,478 | 12/1968 | Williams | 248—346 |

FOREIGN PATENTS

| 508,525 | 1/1955 | Italy | 273—129 |

HARLAND S. SKOGQUIST, Primary Examiner

U.S. Cl. X.R.

273—129